March 15, 1938. B. J. MILLER 2,111,028
SHOCK ABSORBER FOR HANDLE BARS
Original Filed Sept. 10, 1936
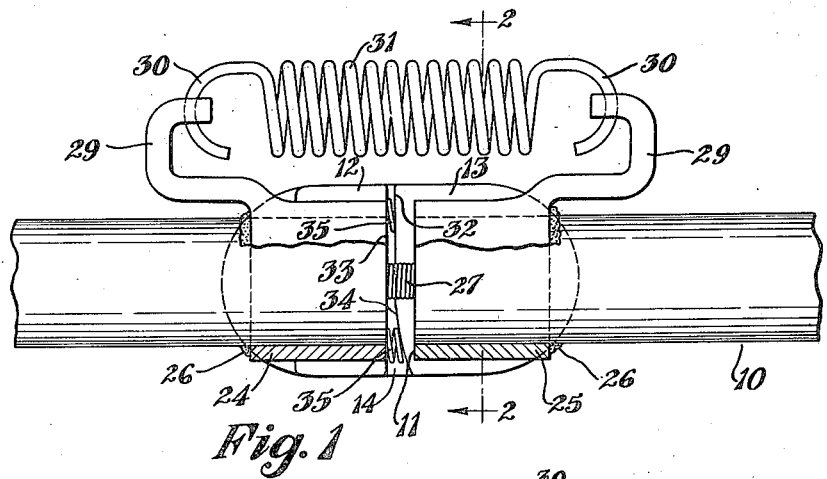
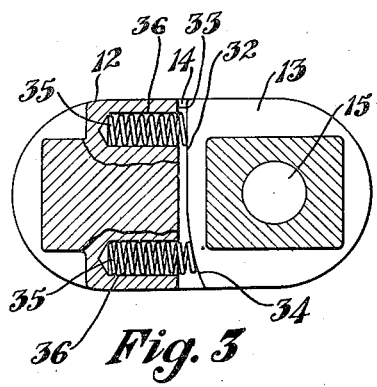
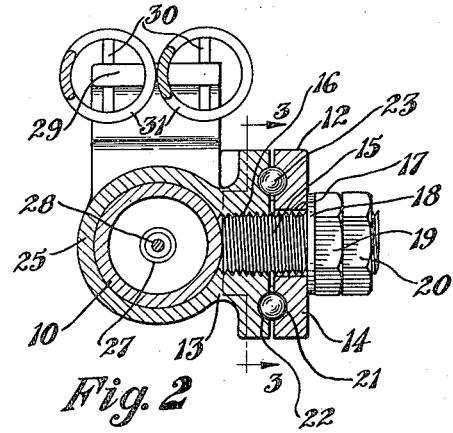
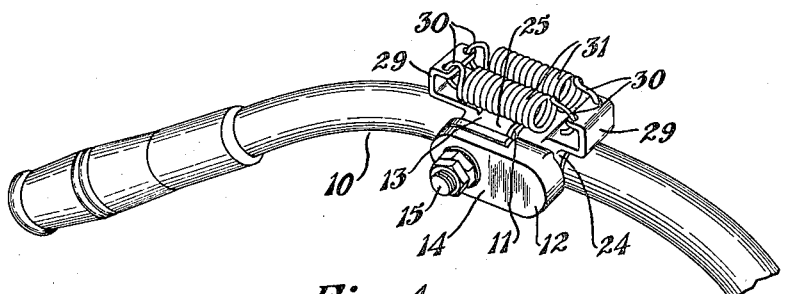
Inventor
Benjamin J. Miller
By Pease and Bishop
Attorneys Patented Mar. 15, 1938

2,111,028

UNITED STATES PATENT OFFICE 2,111,028

SHOCK ABSORBER FOR HANDLE BARS

Benjamin J. Miller, Alliance, Ohio

Application September 10, 1936, Serial No. 100,125
Renewed January 29, 1938

5 Claims. (Cl. 74—551.2)

The invention relates to shock absorbers and more particularly to a shock absorber designed for the handlebars of motorcycles, bicycles and similar vehicles.

The object of the improvement is to provide a shock absorber upon the handlebars of a motorcycle, bicycle or the like in order to compensate for the jolt or shock to the arms and shoulders of the rider when the vehicle passes over an obstruction or through a depression in the roadway.

A further object is to provide such a shock absorber which is simple and inexpensive in construction, efficient in operation, durable in use, and easily and quickly installed upon the handlebars.

Another object of the improvement is to provide a shock absorber having spring means for absorbing the shock of the impact as well as the rebound so that the rider may ride smoothly over obstructions and depressions in the road.

The above objects together with others which will be apparent from the drawing and following description, or which may be later pointed out, may be attained by constructing the improved shock absorber in the manner illustrated and described herein, in which an embodiment of the invention is shown as applied to a handlebar of a motorcycle.

In the drawing,

Figure 1 is a front elevation, partly in section, of portions of a handlebar showing the improved shock absorber applied thereto;

Fig. 2, a section taken as on the line 2—2, Fig. 1;

Fig. 3, a section taken as on the line 3—3, Fig. 2; and

Fig. 4, a fragmentary perspective view of a portion of a motorcycle handlebar viewed as from the driver's seat, showing the improved shock absorber applied thereto.

Similar numerals refer to similar parts throughout the drawing.

A portion of a motorcycle handlebar is indicated generally at 10. In order to apply the improved shock absorber, the handlebar is entirely severed as indicated at 11 at the point where the shock absorber is to be attached.

The shock absorber to which the invention pertains comprises two main parts indicated generally at 12 and 13, each of which may be in the form of a forging, malleable casting or other metal construction having sufficient strength to withstand the shocks to which the device is subjected in use.

The member 12 may have a substantially oblong base or back portion 14 upon one end portion of which the member 13 is journaled as by means of the bolt 15 threaded into a suitably tapped bore 16 in the member 13 and loosely mounted through a smooth bore 17 in the oblong base portion 14, a washer 18, nut 19 and jam nut 20 being provided upon the outer end of said bolt for holding the parts properly adjusted.

An antifriction bearing is preferably provided for this journal and may be in the form of a ball bearing comprising the ball races 21 and 22 formed in the opposed faces of the members 12 and 13 to receive the balls 23.

The members 12 and 13 have the collars 24 and 25, respectively, formed thereon in alignment with each other and spaced apart as best shown in Fig. 1. The severed ends of the handlebar 10 are located through these collars and rigidly connected thereto in any suitable manner, such as by welding, as indicated at 26 in said figure. The usual flexible tubing 27 which ordinarily extends through the hollow handlebars to house the control wire or cable 28 is not in any way interfered with.

Each of the collars 24 and 25 is provided with an outwardly extending hooked lug 29 to which may be hooked the opposite hooked ends 30 of one or preferably two strong coil springs 31, as indicated in the drawing, for the purpose of normally holding the outer end portion of the handlebar in the position shown in Figs. 1 and 4.

The member 13 has the inner straight edge 32 normally spaced slightly from the shoulder 33 upon the member 12 and terminating at its lower end in the arcuate edge 34. Coil springs 35 may be housed within sockets 36 formed in the member 12, the outer ends thereof bearing against the inner edges 32 of the member 13.

It should be understood that one of these shock absorbers is mounted upon each handlebar and the springs 31 are of sufficient strength to bear the weight which the rider ordinarily places upon the handlebars so as to hold the outer ends thereof in the usual normal position, as shown in Figs. 1 and 4.

In the operation of the improved shock absorber, as an obstacle or depression in the road is encountered by the wheels of the vehicle, the springs 31 will permit the outer ends of the handlebars to swing downward and then return to normal position without transmitting any sharp jolt or shock to the arms and shoulders of the rider and the spring 35 will take up the rebound so as to prevent any sharp jolt or shock as the outer end portions of the handlebars return to the normal position.

I claim:

1. In combination with a handlebar severed intermediate its ends, a shock absorber comprising a pair of members pivotally connected together, collars upon said members fixed to adjacent end portions of the handlebar, and spring means connected to said collars for normally holding the sections of the handlebar in alignment.

2. In combination with a handlebar severed intermediate its ends, a shock absorber comprising a pair of members pivotally connected together, collars upon said members fixed to adjacent end portions of the handlebar, lugs upon the upper sides of said collars, and a spring connected to said lugs for normally holding the sections of the handlebar in alignment.

3. In combination with a handlebar severed intermediate its ends, a shock absorber comprising a pair of members pivotally connected together, collars upon said members fixed to adjacent end portions of the handlebar, lugs upon the upper sides of said collars, a spring connected to said lugs for normally holding the sections of the handlebar in alignment, and a cushion interposed between said members.

4. In combination with a handlebar severed intermediate its ends, a shock absorber comprising a pair of members, collars upon said members fixed to adjacent end portions of the sections of the handlebar, a base portion on one member extending across the other member and to which said other member is pivoted, a ball bearing at said pivotal point, upwardly extending lugs upon said collars, a coil spring connected at opposite ends to said lugs, said member with the base portion having a socket therein, and a spring in said socket bearing against the inner edge of the other member.

5. In combination with a handlebar severed intermediate its ends, a shock absorber comprising a pair of members pivotally connected together, collars upon said members fixed to adjacent end portions of the handlebar, and spring means operatively associated with said members for normally holding the sections of the handlebar in alignment.

BENJAMIN J. MILLER.